US011983040B2

United States Patent
Choi et al.

(10) Patent No.: US 11,983,040 B2
(45) Date of Patent: May 14, 2024

(54) MULTI-AXIS EDGE BENDED DISPLAY FOR INFINITY PORTABLE INFORMATION HANDLING SYSTEM

(71) Applicant: Dell Products L.P., Round Rock, TX (US)

(72) Inventors: Duck Soo Choi, Austin, TX (US); Jong Seo Lee, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 234 days.

(21) Appl. No.: 17/071,324

(22) Filed: Oct. 15, 2020

(65) Prior Publication Data

US 2022/0121243 A1   Apr. 21, 2022

(51) Int. Cl.
*G06F 1/16* (2006.01)
*G09G 3/3208* (2016.01)

(52) U.S. Cl.
CPC .......... *G06F 1/1652* (2013.01); *G06F 1/1681* (2013.01); *G09G 3/3208* (2013.01); *G09G 2300/0452* (2013.01); *G09G 2380/02* (2013.01)

(58) Field of Classification Search
CPC ....... G09G 2340/0407; G09G 2380/02; G09G 3/3208; G09G 2300/0452; G06F 1/1652; G06F 1/1681; G06F 1/1616; H01L 23/49551; H01L 51/0097; H01L 2251/5338; H01L 27/3255; B32B 38/0004; H10K 77/111; G02F 1/133305; H05K 1/028; H05K 5/0226; F16C 11/04
See application file for complete search history.

(56) References Cited

U.S. PATENT DOCUMENTS

| 8,716,932 | B2 | 5/2014 | Rappoport et al. |
| 9,484,391 | B2 | 11/2016 | Kwon |
| 2012/0218219 | A1* | 8/2012 | Rappoport .......... H01L 51/0097 345/174 |
| 2014/0231763 | A1* | 8/2014 | Kim ..................... H01L 51/5256 438/34 |
| 2018/0095502 | A1* | 4/2018 | Yamazaki ............... F16M 11/38 |
| 2018/0110139 | A1* | 4/2018 | Seo ........................ G06F 1/1681 |
| 2019/0146548 | A1* | 5/2019 | Li .......................... G06F 1/1652 361/679.01 |
| 2019/0269011 | A1* | 8/2019 | Lee ....................... H05K 3/0014 |
| 2020/0150723 | A1* | 5/2020 | Lin ........................ G06F 1/1652 |
| 2020/0194525 | A1 | 6/2020 | Lin et al. |
| 2020/0401185 | A1* | 12/2020 | Won ..................... B32B 38/0004 |
| 2021/0291493 | A1* | 9/2021 | Kim ....................... B32B 17/067 |
| 2021/0376006 | A1* | 12/2021 | Won ..................... H01L 27/3276 |

FOREIGN PATENT DOCUMENTS

EP         3241252 B1     3/2021

* cited by examiner

*Primary Examiner* — Amr A Awad
*Assistant Examiner* — Aaron Midkiff
(74) *Attorney, Agent, or Firm* — ZAGORIN CAVE LLP; Robert W. Holland

(57) ABSTRACT

A portable information handling system couples a display film to a housing with a minimal bezel by forming a slot in a corner of the display film having rounded portions on opposing sides of the slot that conform to a rounded shape of the housing perimeter support for the display film. In an embodiment having a dual housing display configuration, the display film folds over a hinge and has a slot formed in each corner with a hinge indent aligned at the hinge coupling location to accept a hinge end cover.

20 Claims, 5 Drawing Sheets

MULTI-AXIS EDGE BENDED DISPLAY FOR INFINITY PORTABLE INFORMATION HANDLING SYSTEM

BACKGROUND OF THE INVENTION

Field of the Invention

The present invention relates in general to the field of portable information handling systems, and more particularly to a multi-axis edge bended display for an infinity portable information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that rotationally couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Recently, low profile portable information handling systems have trended towards replacing the integrated keyboard with a second display. In the clamshell mode, the second display presents a keyboard that the end user can use to type keyed inputs detected by a touchscreen sensor. In the tablet mode, the housing portions rotate 180 degrees so that both housing portions are in a common plane to offer display viewing of content at both displays. In some instances, a single foldable display film, such as a plastic organic light emitting diode (POLED) display film, is disposed across both housing portions to fold at a hinge that rotationally couples the housing portions. This approach provides a contiguous viewing area at the display in the tablet position, which tends to provide end users with a more favorable experience when viewing content, such as multimedia content like movies that are presented with the full display dimensions.

One difficulty with presentation of visual images at the display in the tablet mode is that coupling of the display to the housing portions tends to result in some inactive display area around the perimeter of the display, which is normally covered by a bezel. Generally, end user's prefer a display with as much of an "infinity" appearance as possible, such as by extending the display to the edge of the housing so that little or no inactive area is visible to the end user around the perimeter of the display. One difficulty with obtaining such an infinity appearance is that the display film has to fold in a precise manner around the display perimeter, otherwise irregularities may be visible to the end user at the display surface.

SUMMARY OF THE INVENTION

Therefore, a need has arisen for a system and method which provides a display presentation at a housing having a minimal inactive area at the outer perimeter of the display.

In accordance with the present invention, a system and method are provided which substantially reduce the disadvantages and problems associated with previous methods and systems for presentation of visual images with a minimal bezel. An information handling system housing having a rounded side surface at an outer perimeter supports a display film that folds over the rounded side surface to provide a minimal inactive display area at the housing bezel. The display has a film with a slot in a corner and opposing rounded portions that fold to conform to the housing at the corner aligned to the rounded housing side surface.

More specifically, a portable information handling system processes information with processing components disposed in a portable housing, such as CPU that executes instructions and a memory that stores the information and instructions. A display couples over the portable housing to present the information as visual images, such as a POLED display film. The display film couples to the housing by folding at a rounded side surface of the housing to have a minimal inactive bezel area at an outer perimeter of the display. Display folding is provided by a slot formed in a corner of the display film and having a rounded portion on opposing sides of the slot that conforms to the circumference of the housing rounded side surface. At folding of the display film, the slot aligns with the housing corner while the rounded portions on opposing sides of the slot conform to the housing rounded surface to provide a minimally spaced fold configuration that enhances display presentation. In one embodiment, the fold at the corner is covered to further enhances the display appearance and protect against inadvertent damage.

The present invention provides a number of important technical advantages. One example of an important technical advantage is that an infinity edge display film couples to a housing to have a zero bezel appearance. The display film folds over a rounded outer perimeter of the housing to provide minimal inactive display area relative to an end user viewing angle. The display film corners have slot with opposing rounded portions to aid in folding the display over each housing corner. The slot provides a minimal spacing of the display film at the corner and the opposing rounded portions conform to the circumference of the rounded housing side surface so that disruption to the display appearance is minimized at the corner folds.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system couples a display film with corners formed to conform to a rounded housing shape for a zero bezel configuration. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
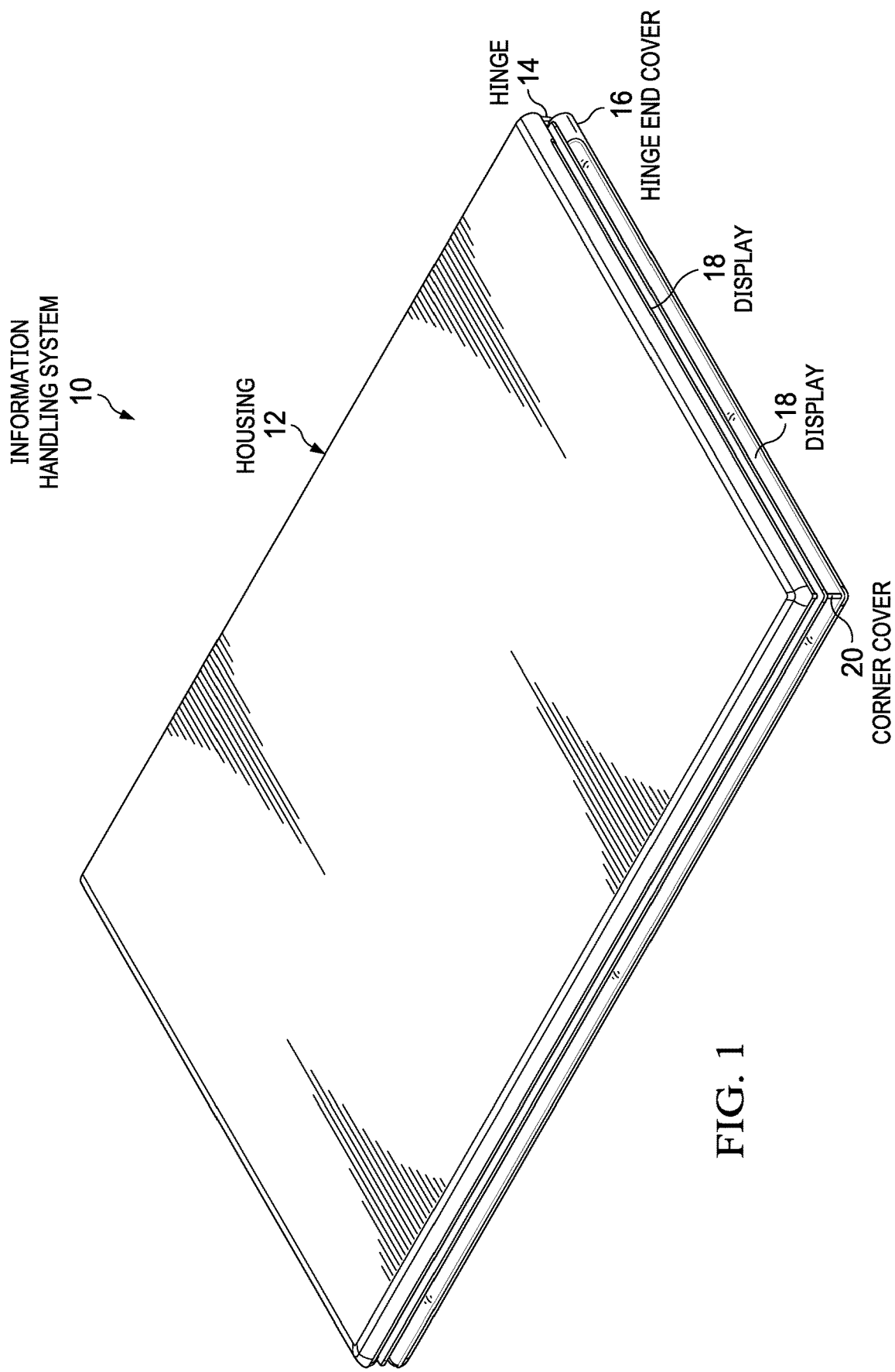
FIG. 1 depicts a side perspective view of a portable information handling system in a closed position and having display with a minimal bezel.

Referring now to FIG. 1, a side perspective view depicts a portable information handling system 10 in a closed position and having a display 18 with a minimal bezel. Information handling system 10 is built in a housing 12 having rotationally coupled housing portions that rotate from the depicted closed position to an open position about a hinge 14. Display 18 is a foldable display film that folds over a rounded side of the periphery of housing 12. For example, display 18 is an organic light emitting diode (OLED) display film, a plastic OLED (POLED) display film or a foldable liquid crystal display that folds over the curved outer periphery of housing 12. In the example embodiment, display 18 is a contiguous display film that extends across the housing and folds at hinge 14 in the closed position. Hinge end cover 16 couples housing 12 and display 18 to provide support as display 18 folds and unfolds with rotation between the closed and an open position. A corner cover 20 couples over display 18 at each corner of housing 12 where display 18 folds at the rounded housing sides, as explained in greater depth below.

Figure 2:
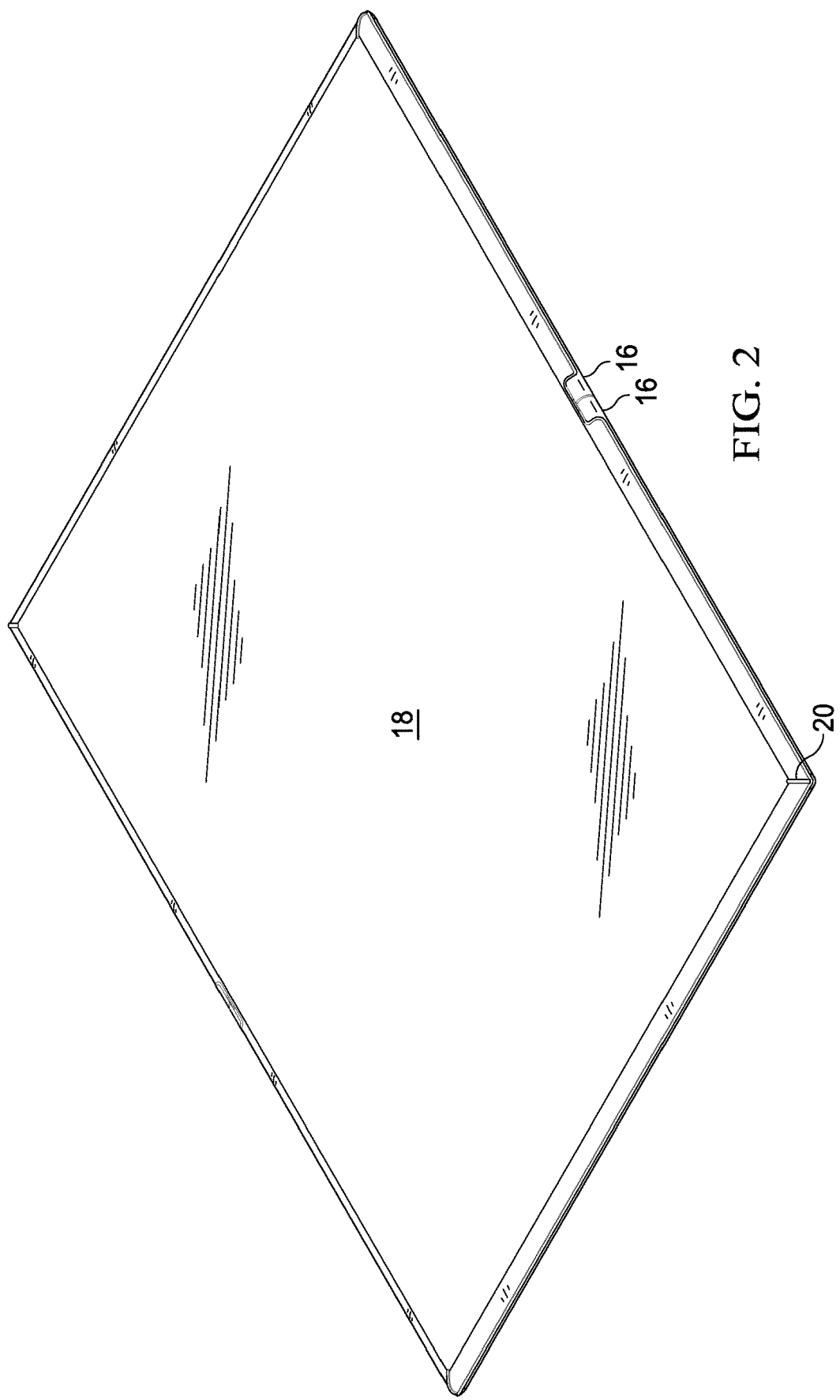
FIG. 2 depicts a side perspective view of the portable information handling system in an open tablet position.

Referring now to FIG. 2, a side perspective view depicts portable information handling system 10 in an open tablet position. For instance, housing 12 rotates about the hinge for 180 degrees from the closed position to unfold display 18 to a flat configuration. In one example embodiment, housing 12 rotates approximately 90 degrees to a clamshell configuration so that a keyboard presented on one portion of display 18 accepts typed inputs while an end user views output at a raised portion of display 18. In the tablet configuration, display 18 provides visual images across the upper surface of housing 12 and at least a part of the rounded side surface along the perimeter of housing 12. That is, display 18 as a film coupled to housing 12 at initial assembly has an outer perimeter portion folded to conform to housing 12 along its rounded side surface. As described below, maintaining a continuous viewing presentation at display 18 through the corner portions presents a difficulty when conforming display 18 to housing 12. The zero bezel presentation desired by end users is achieved while using a minimal corner cover 20 at the intersection of folded display film material at the housing corners.

Figure 3:
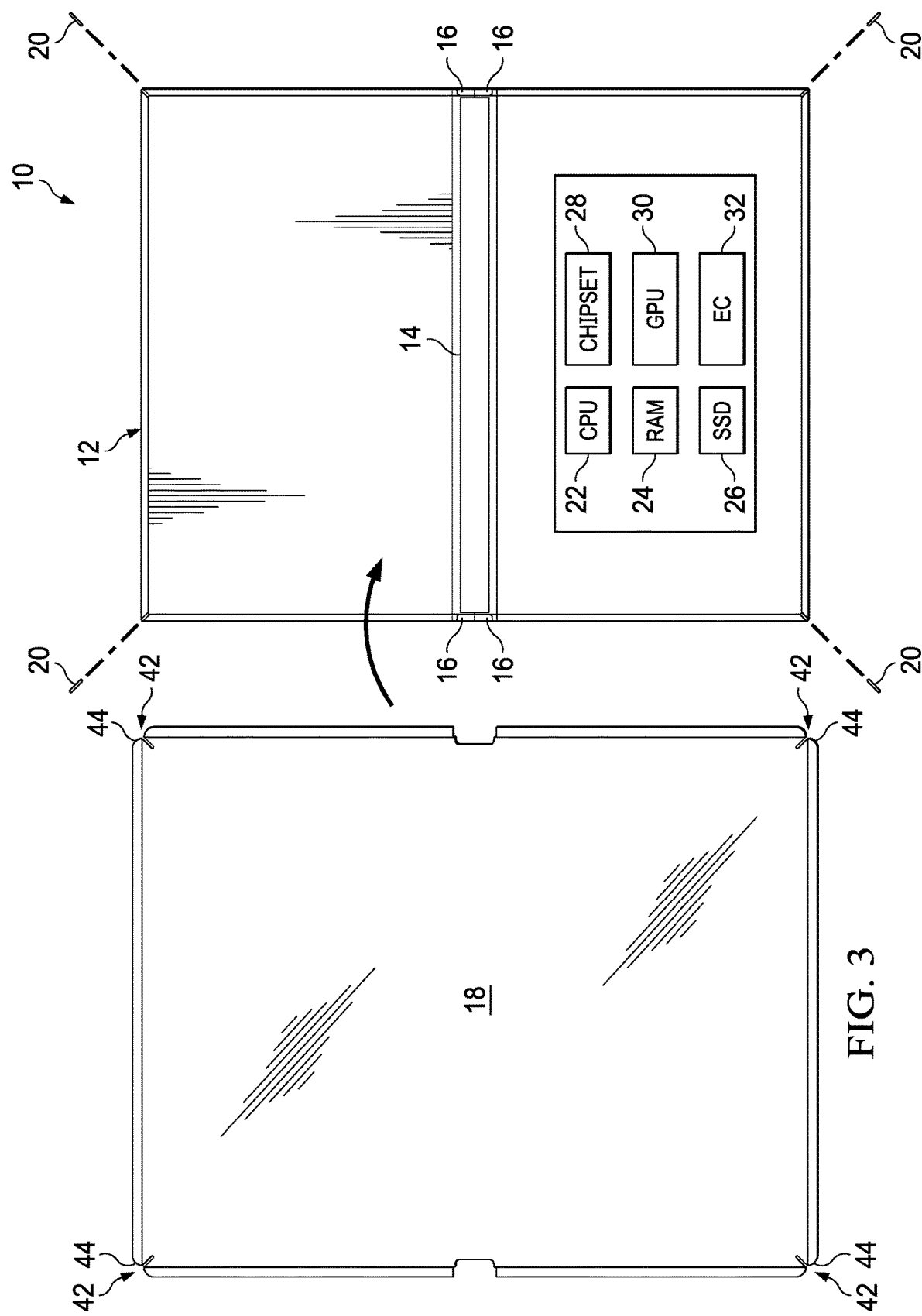
FIG. 3 depicts an upper exploded view of the information handling system alignment of the display over the housing to achieve a minimal bezel configuration.

Referring now to FIG. 3, an upper exploded view of information handling system 10 depicts alignment of display 18 over housing 12 to achieve a minimal bezel configuration. Information handling system 10 housing 12 has first and second housing portions rotationally coupled by a hinge 14 to support rotation between at least the closed and tablet positions. Housing 12 provides space in which processing components are disposed to cooperatively process information. In the example embodiment, a central processing unit (CPU) 22 processes information by executing instructions with the information and instructions stored in random access memory (RAM) 24. A solid state drive (SSD) 26 provides persistent storage of information and instructions between power down states, such as an operating system and applications stored in flash or other non-transient memory and retrieved to RAM 24 at power up. A chipset 28 coordinates interactions by various hardware components with CPU 22, such as clock speed, graphics processing and memory accesses. A graphics processing unit (GPU) 28 interfaces with CPU 22 to provides processing for graphics presentation, such as generation of pixel values for presentation at display 18. An embedded controller 32 interfaces with CPU 22 and provides management of physical device interfaces, such as interactions with input/output devices, and application of power and thermal control. Housing 12 has a rounded corner about its perimeter as shown in FIGS. 1 and 2.

Display 18 fits over top of housing 12 so that each corner of display 18 aligns with and couples to a corner of housing 12. In each corner of display 18, a slot 42 is formed that aligns with each corner of housing 12. On opposing sides of each slot 42 and rounded portion is formed that conforms to the rounded shape of the housing 12 perimeter. When display 18 couples to housing 12, the film folds at each corner of housing 12 at slot 42, which is covered by corner cover 20. Folding at slot 42 brings rounded portion 44 against the rounded side of housing 12 so that display 18 conforms to housing 12 with rounded portion 44 conforming to the physical outline of the housing rounded side surface at the corner. Slot 42 provides a clean fold of the display film at the corner to avoid overlapping display material while the conforming shapes of rounded portion 44 and the rounded side surface of housing 12 minimize the portions of housing 12 that do not present visual information. In the example embodiment, an indent formed at the center of display 18 at the coupling location of hinge 14 provides space to couple hinge end covers 16 on opposing sides of housing 12. Indents on opposing sides of display 18 align at the hinge coupling location where rotation of the housing portions operates to fold display 18.

Figure 4:
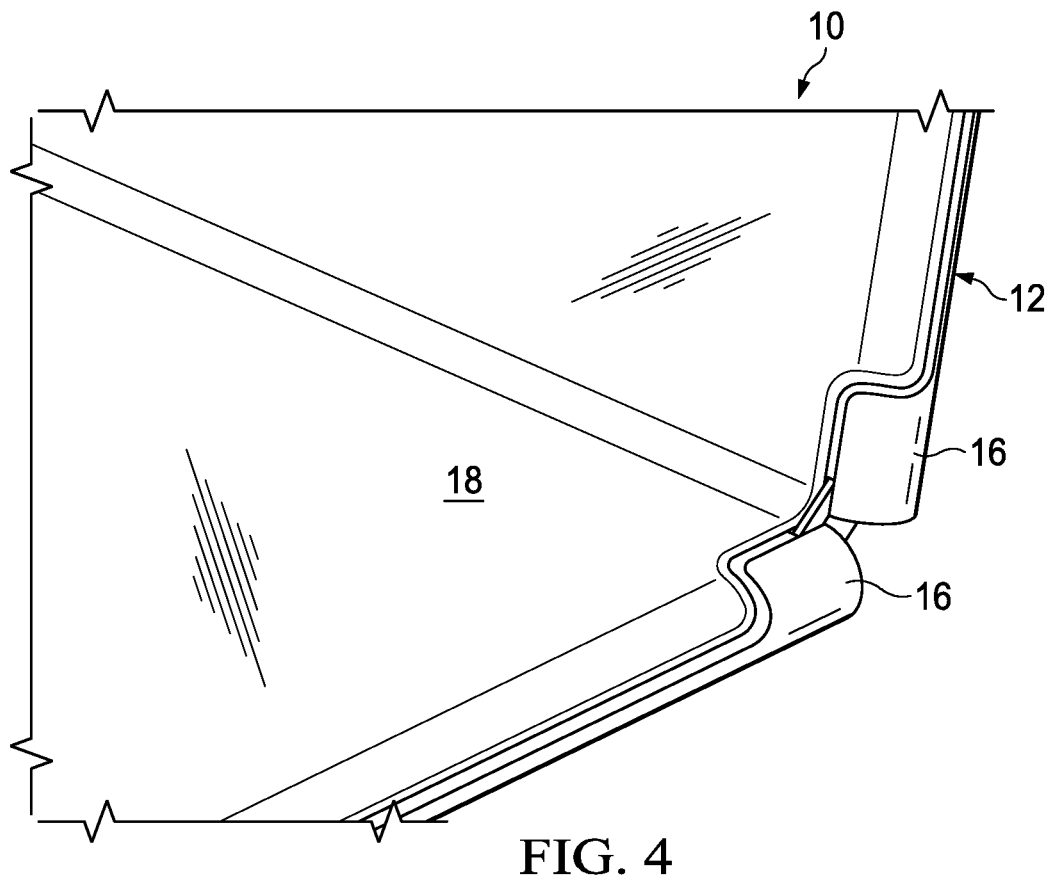
FIG. 4 depicts a side perspective view of the information handling system in a clamshell position having hinge end covers cooperating to manage a fold of the display.

Referring now to FIG. 4, a side perspective view of information handling system 10 in a clamshell position depicts hinge end covers 16 cooperating to manage a fold of display 18. Display 18 folds over the rounded side surface of housing 12 so that visual images are presented with a minimal outside perimeter of inactive display area. Hinge end cover is, for instance, an end piece that couples to housing 12 and attaches over an inactive portion of display 18 to protect against side impact while only slightly increasing the overall perimeter of housing 12.

Figure 5A:
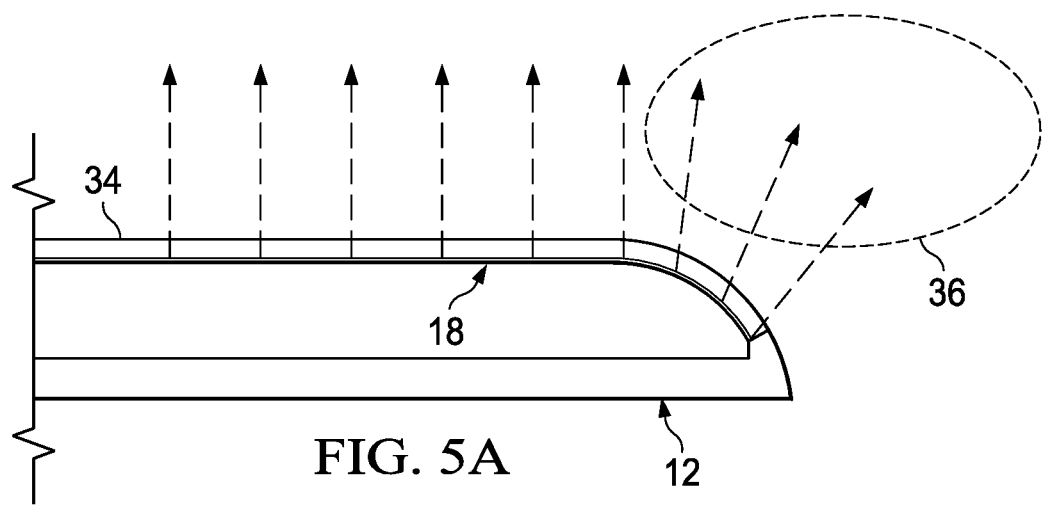
FIGS. 5A, 5B and 5C depict an arrangement of pixels at a display on the perimeter of a housing to obtain a desired visual image presentation.
Figure 5B:
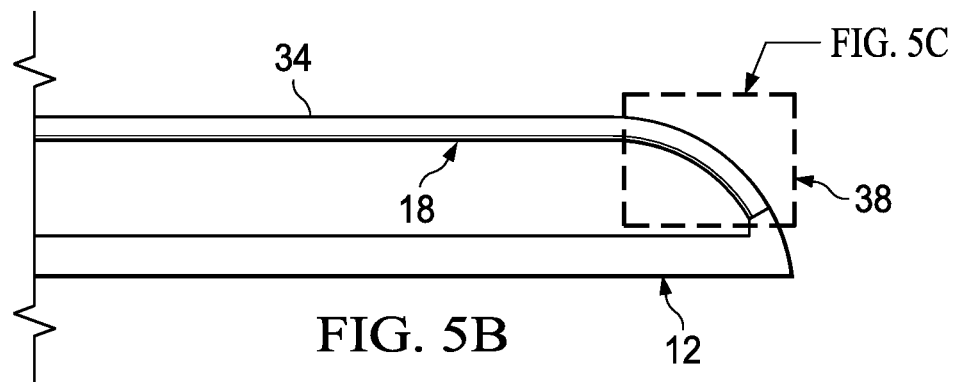
Figure 5C:
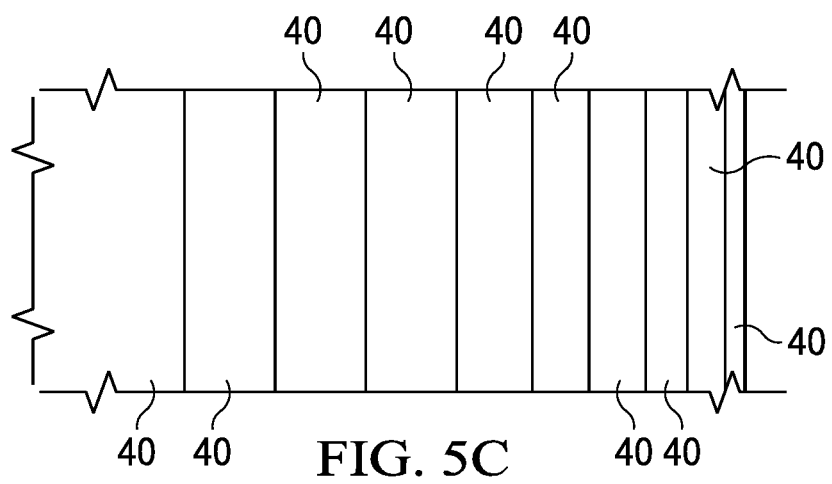

Referring now to FIGS. 5A, 5B and 5C, an arrangement is depicted of pixels 40 at a display 18 on the perimeter of a housing 12 to obtain a desired visual image presentation. FIG. 5A depicts a glass cover 34 coupled over a POLED display 18 that folds over a rounded edge of housing 12 to present a visual image along the rounded edge at a refracted area 36. Distortions of the visual image at refracted area 36 may be performed with various manipulations of light passage through glass 34 to adjust the direction of light refraction. FIG. 5B illustrates an example embodiment where a compensation factor 38 is instead provided by adjustments to the size of pixels 40 as illustrated by FIG. 5C. Within the central main viewing area of display, pixels 40 have a uniform size that present visual images with pixel values communicated from a graphics processor. As display 18 folds over the rounded side surface of housing 12 pixels 40 have a gradient size that decreases to match the radius of the rounded housing side surface. The decreased pixel size compensates for distortions in light presentation relative to an end user viewing the display image from a perpendicular viewing angle relative to the display main central area.

Although the present invention has been described in detail, it should be understood that various changes, substitutions and alterations can be made hereto without departing from the spirit and scope of the invention as defined by the appended claims.

What is claimed is:

1. An information handling system comprising:
a housing having a rounded corner with a curved shape along a side of the housing from an upper surface to a lower surface;
a processor disposed in the housing and operable to process information;
a memory disposed in the housing and interfaced with the processor, the memory operable to store the instructions and information; and
a display film interfaced with the processor and operable to present the visual information, the display film disposed over the housing and having a corner portion to fit at the housing rounded corner, the corner portion when in a planar configuration having opposing rounded portions separated by a slot unit configured to align and to fold at the housing rounded corner.

2. The information handling system of claim 1 further comprising:
a corner cover coupled to the housing at the slot unit.

3. The information handling system of claim 1 wherein the display film comprises a plastic organic light emitting diode display film.

4. The information handling system of claim 1 wherein:
the housing comprises first and second portions rotationally coupled by a hinge; and
the display film is disposed over the first housing portion, the first housing portion having first and second rounded corners opposite the hinge, the display film having first and second corner portions to align with the first and second rounded corners, each of the first and second corner portions having opposing rounded portions separated by a slot unit configured to align and to fold at the housing rounded corner.

5. The information handling system of claim 1 wherein:
the housing comprises first and second housing portions rotationally coupled by a hinge; and
the display film is disposed over the first and second housing portions, each of the first and second housing portions having first and second rounded corners opposite the hinge, the display film having first and second corner portions at each side to align with the first and second rounded corners of the first and second housing portions, each of the first and second coiner portions having opposing rounded portions separated by a slot unit configured to align to fold at the housing rounded corner.

6. The information handling system of claim 5 wherein the display film further has first and second hinge portions on opposite sides having an indent aligned with a hinge end cover disposed at each of opposing sides of the housing.

7. The information handling system of claim 1 wherein the housing comprises a rounded side edge that supports the display film.

8. The information handling system of claim 7 further comprising:
plural pixels integrated in the display film, each pixel operable to illuminate a color;
wherein the plural pixels have a uniform size in a central area and a decreasing size towards a side area where the display film folds over the housing rounded side edge.

9. The information handling system of claim 1 wherein the display film rounded corners have substantially a curvature of the housing rounded corner.

10. A method for coupling a display film to an information handling system housing, the method comprising:
defining a slot unit configured to align at a housing rounded corner, the slot unit in a corner of the display film when the display film is in a planar configuration;
defining rounded portions of the slot unit in the display film on opposing sides of the slot unit when the display film is in the planar configuration; and
coupling the display film to a housing to align the slot unit with a corner of the housing, the rounded portions folding around a curved side of the housing, the curved side of the housing having a curved shape along a side of the housing from an upper surface to a lower surface.

11. The method of claim 10 further comprising:
defining sides of the housing that intersect at the corner to have a rounded surface of a curvature; and
adapting the rounded portions to conform to the curvature.

12. The method of claim 10 further comprising:
coupling first and second housing portions with a hinge;

defining an indent in the display film;
coupling the display film to the housing with the indent aligned at a hinge coupling location; and
coupling the display film at the indent with a hinge end cover.

13. The method of claim 10 further comprising:
coupling first and second housing portions with a hinge;
defining the slot unit in each corner of the display film;
defining the rounded portions in the display film on opposing sides of each slot unit; and
coupling the display film to the housing to align the slot unit with first and second corners of each the first and second housing portions, the display film configured to fold at the hinge.

14. The method of claim 13 further comprising:
defining first and second indents on opposing sides of the display film to align with the hinge;
coupling the display film to the housing with the first and second indents aligned with first and second hinge coupling locations; and
coupling the display film at the first and second indents with first and second hinge end covers.

15. The method of claim 10 further comprising:
presenting images at the display film with uniformly sized pixels; and
presenting images at the display film periphery with pixels of decreased size relative to the uniformly-sized pixels.

16. The method of claim 10 wherein the display film comprises an organic it emitting diode display film.

17. A display comprising:
a housing having a rounded corner along a side from an upper surface to a lower surface; and
a display film coupled to the rounded corner, the display film when in a planar configuration having a slot unit configured to align with the rounded corner and having rounded portions on opposing sides of the slot unit formed to fold from the planar configuration to conform with the rounded corner when folded over a perimeter of the housing.

18. The display of claim 17 wherein the display film comprises an organic light emitting diode display film.

19. The display of claim 18 comprising:
a first set of pixels disposed in a central region of the display film and having a uniform size; and
a second set of pixels disposed along a periphery of the display film at the rounded corner and having less than the uniform size.

20. The display of claim 19 wherein the display film further has an indent formed to align with a hinge coupling location.

* * * * *

UNITED STATES PATENT AND TRADEMARK OFFICE
CERTIFICATE OF CORRECTION

PATENT NO. : 11,983,040 B2
APPLICATION NO. : 17/071324
DATED : May 14, 2024
INVENTOR(S) : Duck Soo Choi and Jong Seo Lee It is certified that error appears in the above-identified patent and that said Letters Patent is hereby corrected as shown below:

In the Claims

Column 6 Line 27, In Claim 5, Line 10, please replace "coiner" with --corner--;
Column 8 Line 5, In Claim 16, Line 2, please replace "it" with --light--.

Signed and Sealed this
Twenty-fifth Day of June, 2024

Katherine Kelly Vidal
*Director of the United States Patent and Trademark Office*